United States Patent
Moradnia (10) Patent No.: US 12,448,060 B2
(45) Date of Patent: Oct. 21, 2025

(54) PNEUMATIC BLADDER AERODYNAMIC DEVICE

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 18/180,632

(22) Filed: Mar. 8, 2023

(65) Prior Publication Data

US 2024/0300592 A1 Sep. 12, 2024

(51) Int. Cl.
| | |
|---|---|
| *B62D 35/00* | (2006.01) |
| *B60W 30/02* | (2012.01) |
| *B60W 40/10* | (2012.01) |
| *B62D 35/02* | (2006.01) |

(52) U.S. Cl.
CPC .......... *B62D 35/005* (2013.01); *B60W 30/02* (2013.01); *B60W 40/1005* (2013.01); *B62D 35/007* (2013.01); *B62D 35/02* (2013.01)

(58) Field of Classification Search
CPC .... B62D 35/005; B62D 35/007; B62D 35/02; B60W 30/02; B60W 40/1005
See application file for complete search history.

(56) References Cited

U.S. PATENT DOCUMENTS

| | | | |
|---|---|---|---|
| 4,441,751 A * | 4/1984 | Wesley | B62D 35/00 296/180.1 |
| 7,040,690 B2 | 5/2006 | Soja et al. | |
| 8,292,350 B2 | 10/2012 | Li et al. | |
| 8,677,817 B2 | 3/2014 | Li et al. | |
| 8,764,078 B1 * | 7/2014 | Lemonides | B60R 19/54 296/180.1 |
| 10,173,736 B2 | 1/2019 | Ribaldone et al. | |
| 10,308,294 B2 | 6/2019 | Yoon et al. | |
| 10,604,195 B2 | 3/2020 | Tongue et al. | |
| 2005/0248184 A1 | 11/2005 | Piffaretti | |
| 2009/0284042 A1 | 11/2009 | Jungert | |
| 2012/0141271 A1 | 6/2012 | Southwick | |

(Continued)

FOREIGN PATENT DOCUMENTS

| | | |
|---|---|---|
| DE | 3003565 C2 | 11/1988 |
| DE | 10102756 A1 | 7/2002 |

(Continued)

OTHER PUBLICATIONS

Office Action of U.S. Appl. No. 18/180,608 dated Jul. 9, 2025, 17 pages.

*Primary Examiner* — Faye M Fleming
(74) *Attorney, Agent, or Firm* — Rankin, Hill & Clark LLP (57) ABSTRACT

A method of producing a desired driving performance for a vehicle includes regulating a pressure inside a bladder, which defines an outer surface of the vehicle. A change in the bladder pressure changes the shape of the bladder, and thereby changes a shape of the outer surface of the vehicle, thus affecting the aerodynamics of the vehicle. The bladder pressure is regulated to be at a target bladder pressure based on the driving condition of the vehicle, which target bladder pressure can be derived from real-time machine learning or based on previous testing of a prototype of the vehicle, and thus affects aerodynamics of the vehicle so as to produce the desired driving performance for the vehicle in the driving condition.

20 Claims, 8 Drawing Sheets

(56) References Cited

U.S. PATENT DOCUMENTS

| | | | |
|---|---|---|---|
| 2017/0299006 A1 | 10/2017 | Shi et al. | |
| 2023/0347994 A1* | 11/2023 | Steenbeek | B62D 25/2027 |
| 2024/0300593 A1* | 9/2024 | Moradnia | B62D 37/02 |
| 2024/0417006 A1* | 12/2024 | Moradnia | B62D 35/007 |
| 2025/0121893 A1* | 4/2025 | Nastov | B62D 35/005 |

FOREIGN PATENT DOCUMENTS

| | | |
|---|---|---|
| DE | 102005047113 A1 | 4/2007 |
| DE | 202017006243 U1 | 4/2019 |
| DE | 102020103605 A1 | 8/2021 |
| EP | 3601020 A1 | 2/2020 |
| EP | 3426515 B1 | 11/2021 |
| FR | 3089939 | 6/2020 |
| FR | 3097520 | 12/2020 |
| GB | 2475032 | 5/2011 |
| GB | 2495983 A | 5/2013 |
| WO | WO2018178579 A1 | 10/2018 |

\* cited by examiner

PNEUMATIC BLADDER AERODYNAMIC DEVICE

BACKGROUND

Vehicles include outer surfaces that have contours that affect the aerodynamics of the moving vehicle. These outer surfaces may be static and thus do not change shape, and may be part of a body panel or may be a structure attached to a body panel.

BRIEF DESCRIPTION

According to one aspect, a method includes steps a) to d) for operating an inflatable aerodynamic system of a vehicle. The inflatable aerodynamic system includes an elastic bladder including a surface defining a visible surface of the vehicle. The bladder dilates upon an increase in a pressure inside the bladder and/or contracts upon a decrease in the pressure inside the bladder. Step a) includes determining a target pressure inside the bladder that produces a desired driving performance for the vehicle under each of a plurality of driving conditions of the vehicle. Each of the plurality of driving conditions includes different air temperatures around the vehicle, different lift forces exerted on the vehicle, different down forces exerted on the vehicle, different side forces exerted on the vehicle, different drag forces exerted on the vehicle, different air pressure distributions on the vehicle, different geographic locations of the vehicle, different forces applied to brakes of the vehicle, or combinations thereof. Step b) includes assessing a driving condition of the vehicle. The driving condition includes an air temperature around the vehicle, a lift force exerted on the vehicle, a down force exerted on the vehicle, a side force exerted on the vehicle, a drag force exerted on the vehicle, an air pressure distribution on the vehicle, a geographic location of the vehicle, a force applied to brakes of the vehicle, or combinations thereof. Step c) includes matching the driving condition of the vehicle to a target driving condition. The target driving condition is one of the plurality of driving conditions of the vehicle. Step d) includes regulating a pressure inside the bladder toward the target pressure of the target driving condition by regulating an amount of a fluid confined in the bladder, and thereby urging a driving performance for the vehicle towards the desired driving performance under the driving condition.

DETAILED DESCRIPTION

A method of producing a desired driving performance for a vehicle includes regulating a pressure inside a bladder, which defines an outer surface of the vehicle. A change in the bladder pressure changes the shape of the bladder, and thereby changes a shape of the outer surface of the vehicle, thus affecting the aerodynamics of the vehicle. The bladder pressure is regulated to be at a target bladder pressure based on the driving condition of the vehicle, which target bladder pressure can be derived from real-time machine learning or based on previous testing of a prototype of the vehicle, and thus affects aerodynamics of the vehicle so as to produce the desired driving performance for the vehicle in the driving condition.

Referring to the figures, a vehicle 2 includes an inflatable aerodynamic system 4, which includes at least one elastic bladder 6 that can be selectively inflated/deflated to alter the shape of the vehicle 2, thus altering the aerodynamics of the vehicle 2, and thereby affecting the driving performance of the vehicle 2 under various driving conditions.

The inflatable aerodynamic system 4 may also include an internal frame 8 arranged inside the bladder 6, and a fluid supply system 10 fluidly connected to the bladder 6 and supplying fluid to the bladder 6.

The bladder 6 may be stretched over the frame 8 whereby the frame 8 slightly dilates the bladder 6 to give the bladder 6 an initial shape in a initial state (FIGS. 1, 4, 6, 9). The inflatable aerodynamic system 4 does not necessarily include the frame 8, and if the frame 8 is not included, the bladder 6 may itself assume the initial shape in the initial state.

The fluid supply system 10 regulates an amount of fluid (e.g. a gas, air, or liquids) that is delivered to and contained inside the bladder 6. When fluid is delivered to the bladder 6 by the fluid supply system 10, the amount of fluid contained in the bladder 6 increases, causing an internal pressure inside the bladder 6 to increase, thus causing the bladder 6 to further dilate from the initial state towards a dilated state (FIGS. 2, 3, 5, 8, 10). When in the dilated state and when fluid is removed from the bladder 6, the fluid supply system 10 may remove fluid from the bladder 6, decreasing the amount of fluid contained in the bladder 6, thus decreasing the internal pressure inside the bladder 6 and allowing the bladder 6 to contract from the dilated state back towards the initial state. These changes to the inflation level of the bladder 6 can be produced as a factor of the current driving condition of the vehicle 2, and result in changes to the shape of the vehicle 2, and thus alter the aerodynamics of the vehicle 2 as well as affecting the driving performance of the vehicle 2 in the current driving condition.

The frame 8, if included, may be attached to the inside surface 34 of the bladder 6 and may therefore move with the bladder 6 as it dilates and contracts. The frame 8 may be more rigid than the bladder 6, and may thereby support the bladder 6 (e.g. the outer side 50 of the bladder 6) in both the dilated state and the initial state against a flow of air pushing against the bladder, such as while the vehicle 2 is moving for example, or when there is a gush of wind against the vehicle 2, and may thus contribute to, support, or define a shape of the bladder 6 in both the dilated state and the initial state. If the frame 8 is not included, then the bladder 6 may itself define its shape when in the initial state and the dilated state.

The vehicle 2 associated with the inflatable aerodynamic system 4 is not particularly limited, and may be any of a variety of vehicles include a motor vehicle or a non-motor vehicle; for example a bicycle, car, truck, van, bus, scooter, motorcycle, train, plane, boat, or any other vehicle used to transport goods or people. In a non-limiting example, the vehicle 2 is a motor vehicle. The vehicle 2 includes a head 12 at its front, and a tail or boot 14 at its back.

The bladder 6 is elastic, which means it has an at-rest shape when not subject to strain; it can contract, dilate, or distort when subject to a strain; and then it is able to resume its at-rest shape spontaneously after such contraction, dilatation, or distortion when the strain is no longer present.

The frame 8, if included, is arranged inside the bladder 6 and may exert an outward strain on the bladder 6 and dilate the bladder 6 from the at-rest shape to initial state (FIG.), where the bladder 6 is stretched around the frame 8. The fluid, which is removed from, or delivered to, the inside of the bladder 6, i.e. an enclosed volume 16 defined by the bladder 6, may exert additional strain on the bladder 6 so as to, respectively, contract the bladder 6 from the initial state toward a contracted state (FIG.), or dilate the bladder 6 from the initial state toward the dilated state (FIG.).

The bladder 6 may be in fluid communication, via an aperture 18, with the fluid supply system 10, which removes or delivers fluid to the bladder 6 through this fluid communication channel. The bladder 6 confines the fluid in the enclosed volume 16, and may dilate from the initial state towards the dilated state upon an increase in a pressure inside the bladder 6 resulting from an increase in the amount of the fluid confined in the bladder 6, or may contract from the initial state towards the contracted state upon an decrease in a pressure inside the bladder 6 resulting from a decrease in the amount of the fluid confined in the bladder 6. The bladder 6 may return back from the initial state upon the pressure inside the bladder 6 being brought back to being equal to the pressure outside the bladder 6. The fluid supply system 10 may remove or deliver the fluid from/to the enclosed volume 16 of the bladder 6. Thus the fluid supply system 10 may thereby regulate the amount of fluid confined in the bladder 6.

The bladder 6, and more specifically, the enclosed volume 16, is in fluid communication with the fluid supply system 10 via the aperture 18, which extends through a wall of the bladder 6 and provides access into the enclosed volume 16. This configuration allows the fluid to be delivered from the fluid supply system 10, through the aperture 18, and into the enclosed volume 16, and out of the enclosed volume 16 through the aperture 18.

Other than for the aperture 18, the bladder 6 may be substantially fluid-tight, meaning that the fluid can be contained inside the bladder 6 and not leak out via mass flow, although diffusion/permeation of the fluid out of the bladder 6 through the material of the bladder 6 is still possible. The material used to make the bladder 6 is not particularly limited, and may include various polymers and polymer composites that are elastic and substantially fluid-tight.

The fluid supply system 10 may include a fluid supply 20 including a compressor and/or vacuum (e.g. two-way compressor), an adaptor 22 sealing to the bladder 6 around the aperture 18, and a tube 24 connecting the fluid supply 20 to the adaptor 22. The compressor/vacuum of the fluid supply 20 may urge the fluid to/from the fluid supply 20, through the tube 24, through the adaptor 22, and out of/into the enclosed volume 16. The fluid supply system 10 may prevent the fluid from leaking out of the enclosed volume 16 through the aperture 18, e.g. by use of a valve. The fluid supply system 10 can have other known configurations.

When the fluid is removed from the bladder 6 in the initial state, the internal pressure (outward strain) within the bladder 6 may decrease due to the decreased amount of fluid contained in the bladder 6, which may cause the bladder 6 to contract inward from the initial state toward the contracted state. When the fluid is then delivered back to the bladder 6, e.g. through the tube 24 from the fluid supply 20, the internal pressure within the bladder 6 may thereby increase, which may allow the elastic bladder 6 to elastically expand back toward the initial state. When the fluid is delivered to the bladder 6 in the initial state, the internal pressure (outward strain) within the bladder 6 may increase due to the increased amount of fluid contained in the bladder 6, which may cause the bladder 6 to dilate outward from the initial state toward the dilated state. When the fluid is then removed from the bladder 6, e.g. through the tube 24 and back to the fluid supply 20, the internal pressure (outward strain) within the bladder 6 may thereby decrease, which may allow the elastic bladder 6 to elastically contract back toward the initial state.

The bladder 6 is arranged on an outer surface of the vehicle 2 so that when the bladder 6 is moved from the initial state to the contracted state or the dilated state, such movement changes a shape of the outer surface of the vehicle 2. The outer surface of the vehicle 2 can change shape by the bladder 6 changing shape upon dilation and contraction. The dilation and contraction of the bladder 6, and the resulting change in shape of the bladder 6, thus affects the shape of the outer surface of the vehicle 2, which in turn affects the aerodynamics of the vehicle 2 and the driving performance of the vehicle 2.

The bladder 6 may be arranged in a depression 26 in the outer surface of the vehicle 2, with a top/upper, exposed, and visible surface 28 of bladder 6 defining the outer, exposed, and visible surface of the vehicle 2. That is, the bladder 6 is not covered or concealed by other components, panels, or parts. The bladder 6 may have a surface coating applied thereto, such as a coating of paint, varnish, enamel, etc. which dilates and contracts along with the bladder 6 as it dilates and contracts.

The bladder 6 may be arranged anywhere on the vehicle 2, such as on a body panel of the vehicle 2. The vehicle 2 may include more than one elastic bladder 6 as shown in the figures, each of which may be connected to its own individual fluid supply system 10 or to a common fluid supply system 10 and have a surface that defines the outer, exposed, and visible surface of the vehicle 2. The bladder(s) 6 may be arranged, for example, at the boot 14 of the vehicle 2 on a trunk (FIGS. 1-3 and 12) or roof panel to act as a rear spoiler for the vehicle 2; at the head 12 of the vehicle 2 under the front bumper 54 to act as an air dam (FIGS. 4-5); at the head 12 of the vehicle 2 on the front face of the front bumper 54 to change the shape of the front bumper 54; on the roof and above the front windscreen, at any other location on the vehicle 2 including behind the front wheels on a front quarter panel, on the hood panel, on the door panels; as well as combinations thereof by having a plurality of bladders 6 being included as part of the inflatable aerodynamic system 4 and being arranged at different locations on the vehicle 2.

Figure 1:
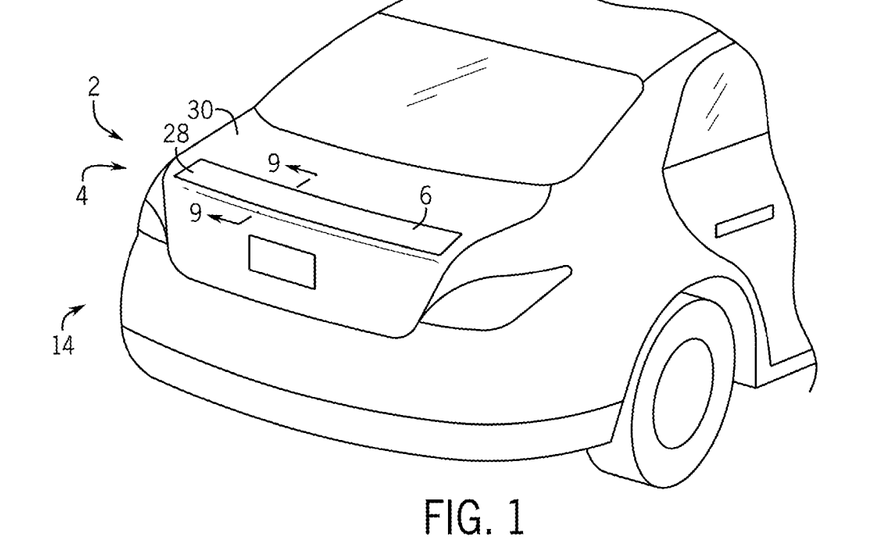
FIG. 1 is a partial perspective view of a rear of a vehicle with an inflatable aerodynamic system in a initial state according to the present subject matter.
Figure 3:
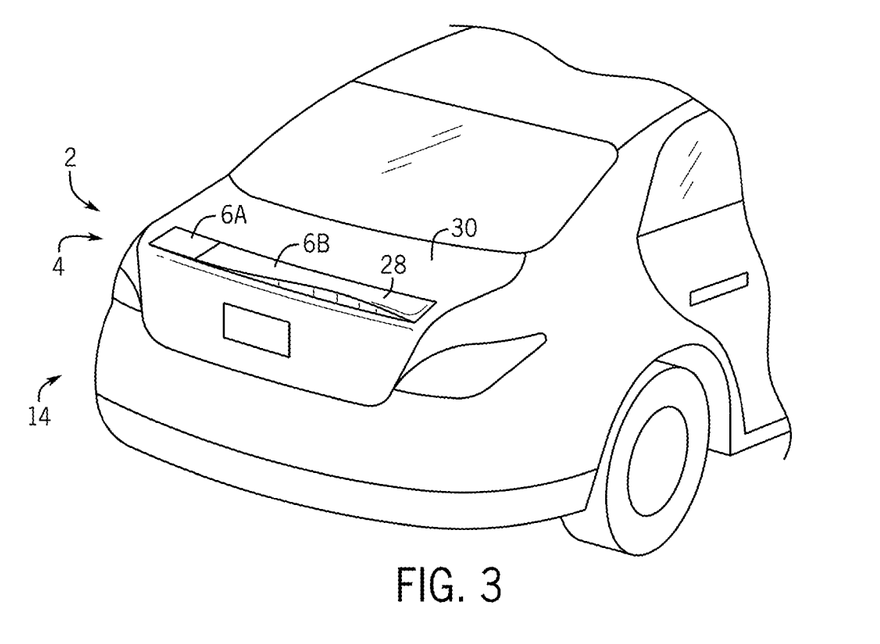
FIG. 3 is a partial perspective view of the inflatable aerodynamic system of FIG. 1 in an asymmetric dilated state.
Figure 4:
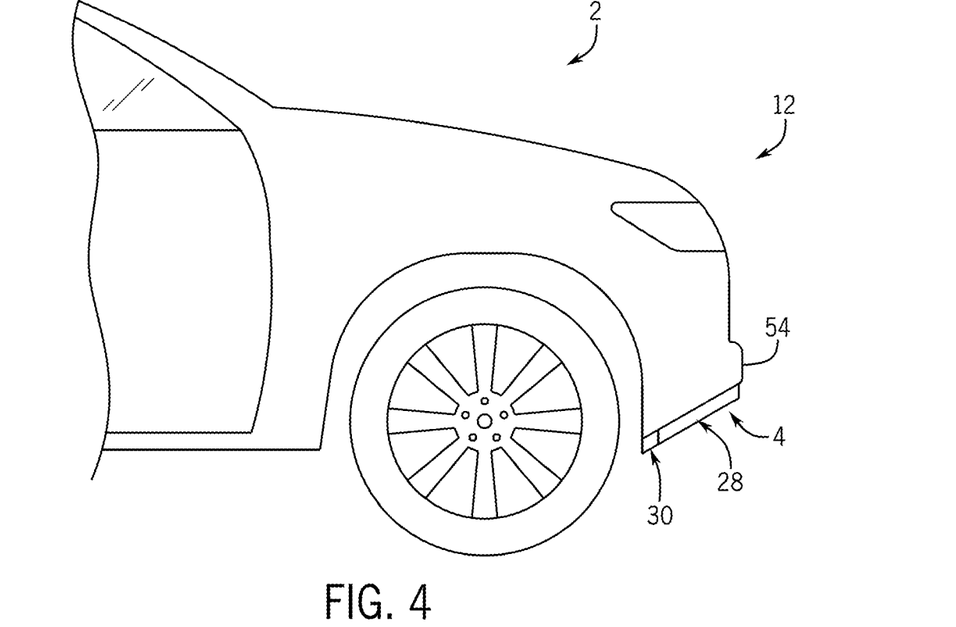
FIG. 4 is a partial side view of a vehicle with an inflatable aerodynamic system in a initial state according to the present subject matter.
Figure 5:
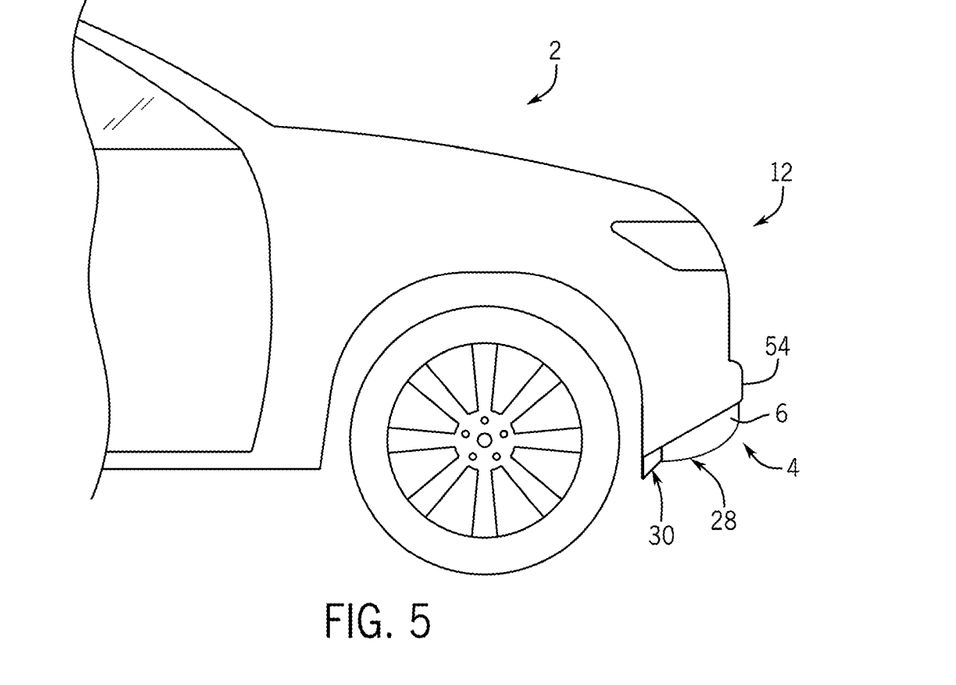
FIG. 5 is a partial side view of the inflatable aerodynamic system of FIG. 4 in a dilated state.
Figure 6:
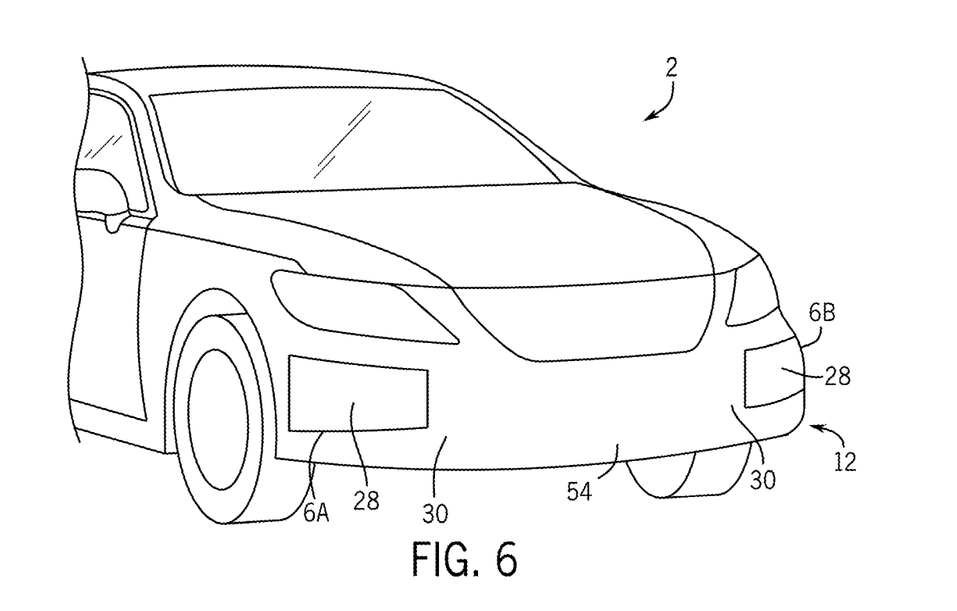
FIG. 6 is a partial perspective view of a front of a vehicle with an inflatable aerodynamic system including two bladders in a initial state according to the present subject matter.
Figure 7:
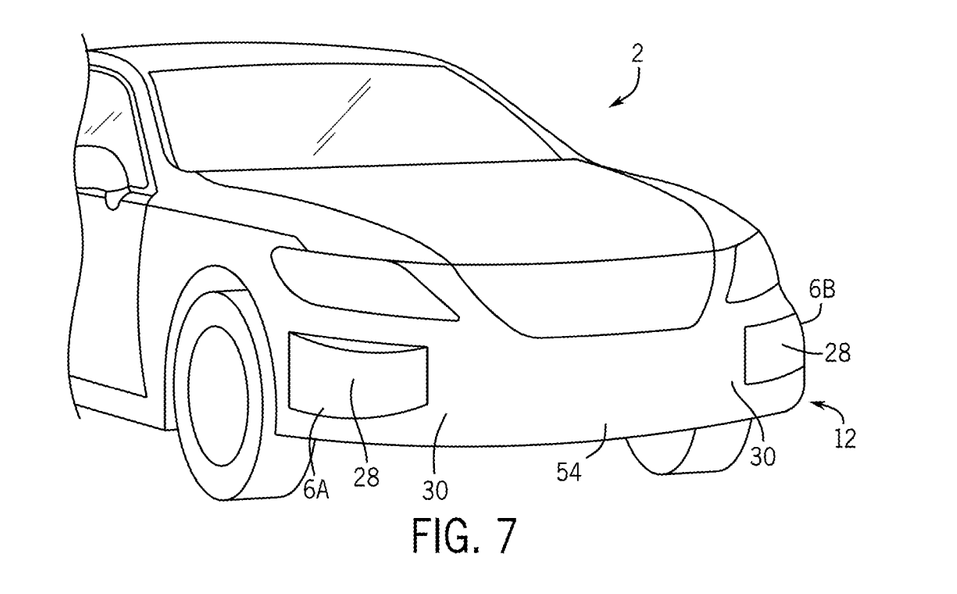
FIG. 7 is a partial perspective view of the inflatable aerodynamic system of FIG. 6 with one bladder in the dilated state and the other bladder in the initial state.
Figure 8:
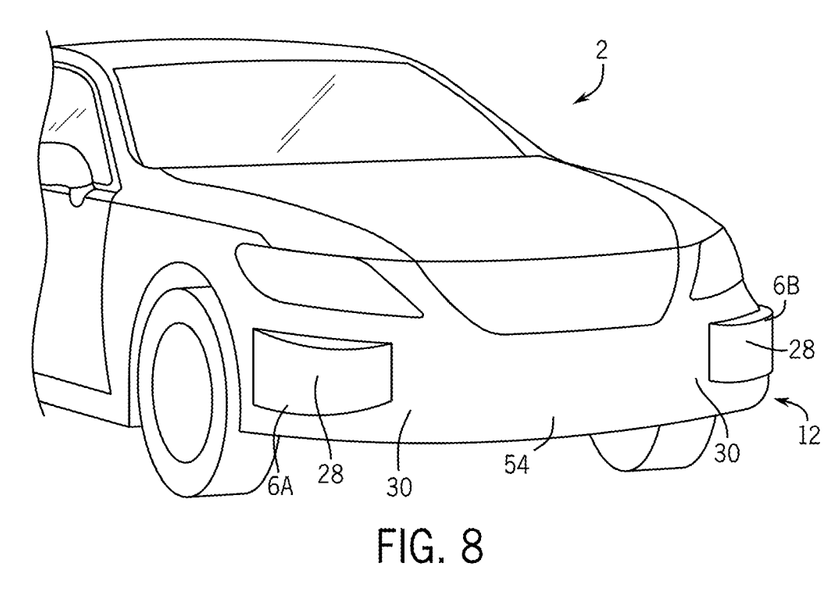
FIG. 8 is a partial perspective view of the inflatable aerodynamic system of FIG. 6 with both bladders in the dilated state.
Figure 9:
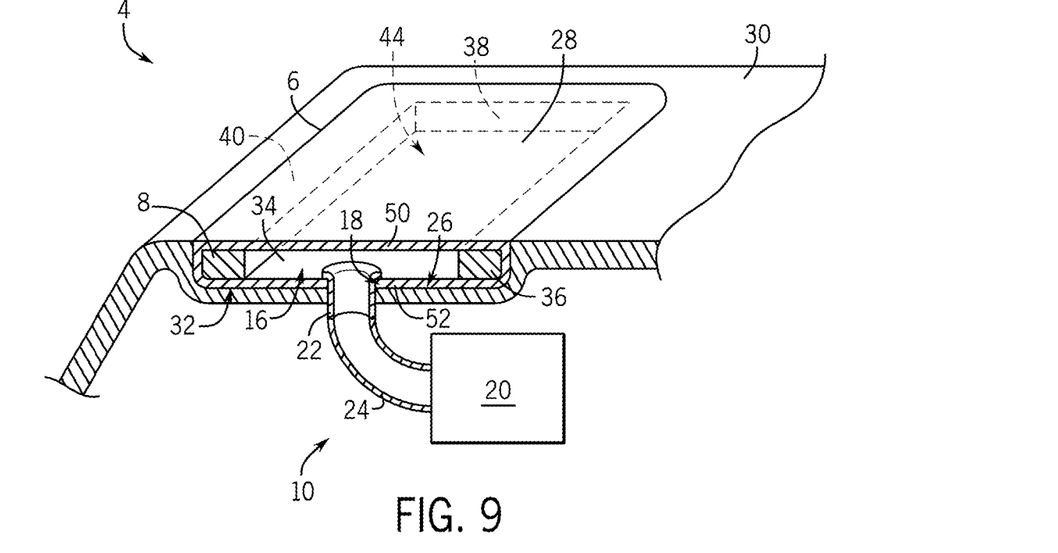
FIG. 9 is a cross-section view of the rear spoiler system of FIG. 1 taken along line 9-9.
Figure 12:
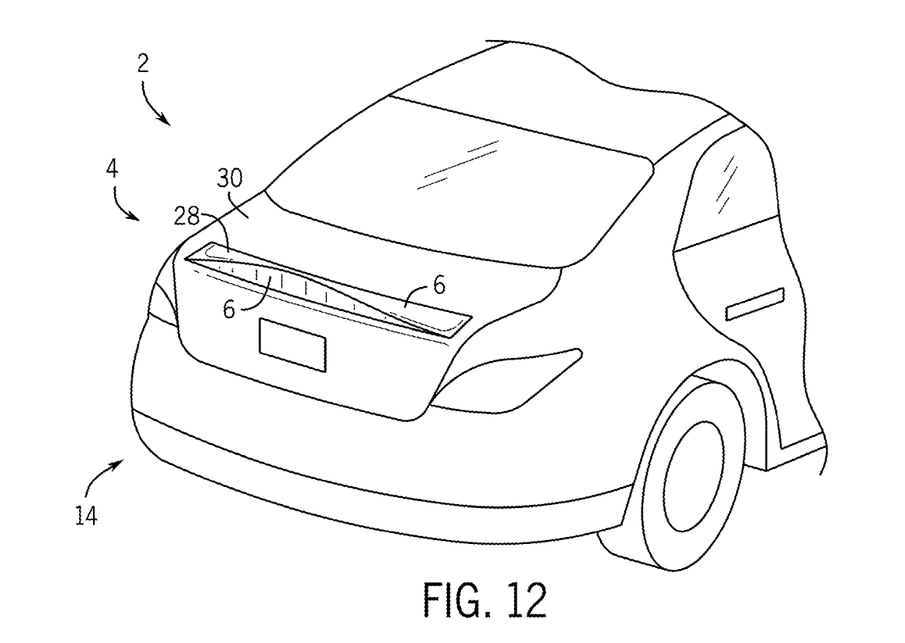
FIG. 12 is a partial perspective view of the rear spoiler system of FIG. 1 in an over-dilated state according to the present subject matter.
Figure 13:
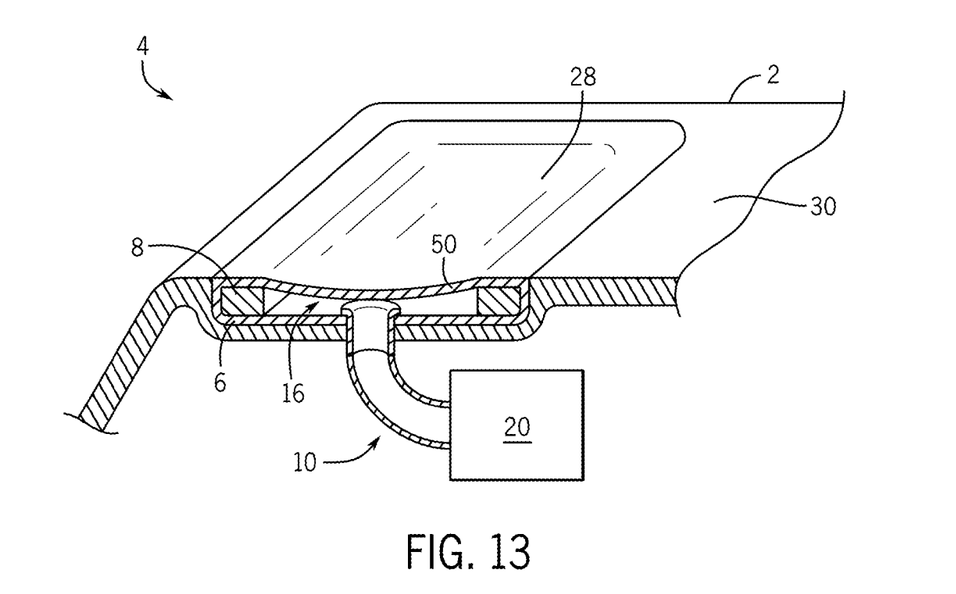
FIG. 13 is a cross-section view of an inflatable aerodynamic system in a contracted state according to the present subject matter.

When the internal pressure inside the bladder 6 equals the pressure outside the bladder 6 (e.g. the atmospheric pressure), the bladder 6 may be in the initial state and the exposed surface 28 of the bladder 6 may be flush with an adjacent outer surface 30 of the vehicle 2 (FIGS. 1, 9). The exposed surface 28 of the bladder 6 may protrude upward from an adjacent outer surface 30 of the boot 14 when the bladder 6 is dilated (FIGS. 2, 3, 12), and the exposed surface 28 of the bladder 6 may be recessed below the adjacent outer surface 30 of the boot 14 when the bladder 6 is in the contracted state (FIG. 13 with concave exposed surface 28). In FIG. 4-5, the bladder 6 may protrudes downward from an adjacent bottom outer surface 30 of the front bumper 54 when the bladder 6 is dilated (FIG. 5), and may be flush with the adjacent bottom outer surface 30 of the front bumper 54 when the bladder 6 is fully contracted (FIG. 4). In FIGS. 6-8, the bladders 6 may protrude forward from an adjacent front outer surface 30 of the front bumper 54 when the bladders 6 are dilated (FIG. 8 and left side of FIG. 7), and may be flush with the adjacent front outer surface 30 of the front bumper 54 when the bladders 6 are fully contracted (FIG. 9 and right side of FIG. 7).

This is not required, and the bladder 6 may not be arranged in the depression 26, and/or the exposed surface 28 of the bladder 6 may stand proud of or be recessed below the adjacent outer surface 30 of the vehicle 2 when in the initial state with the internal pressure inside the bladder 6 being equal the pressure outside the bladder 6. The exposed surface 28 of the bladder 6 may have the same or different aesthetic appearance as the adjacent outer surface 30 of the vehicle 2.

Figure 10:
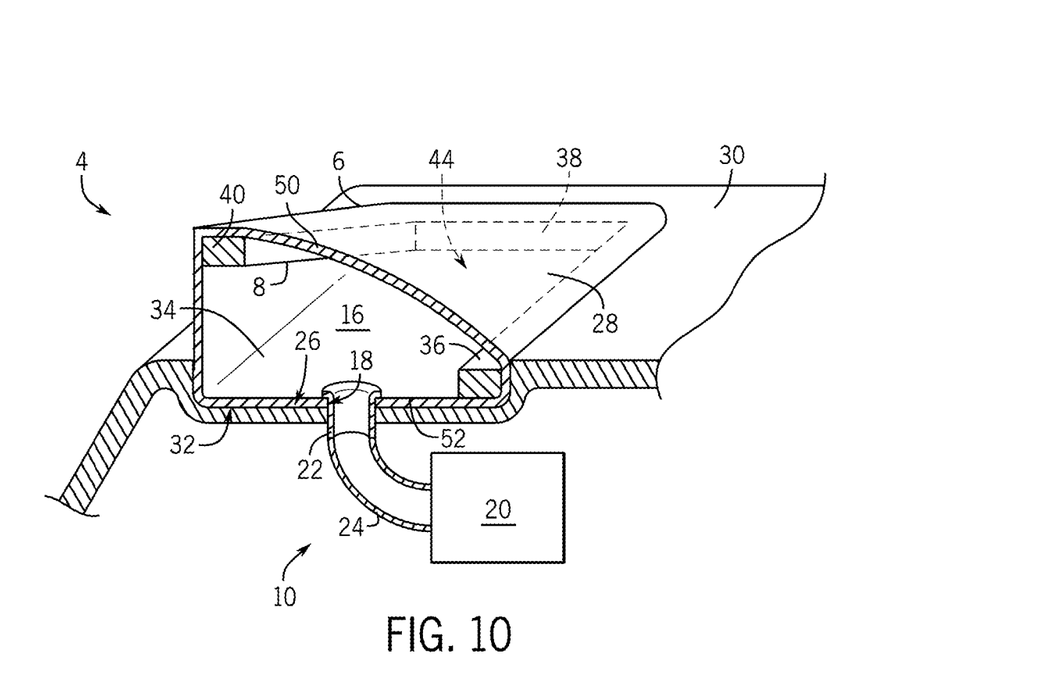
FIG. 10 is a cross-section view of the rear spoiler system of FIG. 2 taken along line 10-10.

When the internal pressure inside the bladder 6 is less than the pressure outside the bladder 6, the bladder 6 may be in the contracted state or be between the initial state and the contracted state, by fluid being removed from the bladder 6 to make it contract toward the contracted state. When the internal pressure inside the bladder 6 is less than the pressure outside the bladder 6, the exposed surface 28 of the bladder 6 may be recessed below the adjacent outer surface 30 of the vehicle 2 and thereby change the shape of the outer surface of the vehicle 2 (FIG. 13). When the internal pressure inside the bladder 6 is greater than the pressure outside the bladder 6, the bladder 6 may be in the dilated state or be between the initial state and the dilated state, by fluid being delivered to the bladder 6 to make it dilate toward the dilated state. When the internal pressure inside the bladder 6 is greater than the pressure outside the bladder 6, the exposed surface 28 of the bladder 6 may stand proud of the adjacent outer surface 30 of the vehicle 2 and thereby change the shape of the outer surface of the vehicle 2 (FIG. 10).

The bladder 6 may be connected to the vehicle 2, by an inner side 52/inner surface 32 of the bladder 6 being in contact with, and directly connected to, the vehicle 2. The inner surface 32 of the bladder may be directly connected to the vehicle 2 in the depression 26. When the bladder 6 is contracted, the exposed surface 28/outer side 50 of the bladder 6, which is not directly connected to the vehicle 2, may move toward (e.g. inward) the vehicle 2 and toward the inner side 52/inner surface 32, which is attached to the vehicle 2. When the bladder 6 is dilated, the exposed surface 28/outer side 50 of the bladder 6, which is not directly connected to the vehicle 2, may move away (e.g. outward) from the vehicle 2 and from the inner side 52/inner surface 32, which is attached to the vehicle 2. The inner surface 32 of the bladder 6 may be connected to the vehicle 2 by an adhesive, mechanical fasteners, welding, or otherwise. The bladder 6 may (also) be connected to the vehicle 2 by the frame 8 being connected to the vehicle 2, such as by fasteners, not shown, extending from the frame 8, through the bladder 6, and to the vehicle 2, and directly connecting the frame 8 to the vehicle 2. These fasteners may connect non-moving portions of the frame 8 with the vehicle 2.

The frame 8 is not particularly limited in shape and construction, is arranged inside the bladder 6, and stretches the bladder 6 to define a shape of the bladder 6 (e.g. a perimeter of the shape of the bladder 6) in the initial state. Being inside the bladder 6, the frame 8 may not be visible because it is inside the bladder 6.

The frame 8 may include sides 36, 38, 40 surrounding an open center 44 with the sides 36, 38, 40 defining the perimeter of the shape of the bladder 6. The frame 8 has a shape, which is thus imparted to the bladder 6 to give the bladder 6 the same general shape in the initial state as the shape of the frame 8. The frame 8 may have more or less sides, and a different shape.

The frame 8 is arranged inside the bladder 6, i.e. in the enclosed volume 16. The frame 8 may be connected to the bladder 6, e.g. by being connected to an inside surface 34 of the bladder 6. The frame 8 may be connected to the inside surface 34 of the outer side 50 of the bladder 6 by adhesive. When the bladder 6 is dilated, the frame 8, or portions thereof (moving portions), may move with the bladder 6 as it dilates, and optionally other portions of the frame 8 (non-moving portions) may not move when the bladder 6 dilates. When the bladder 6 is contracted, the frame 8 may not move with the bladder 6 as it contracts.

The frame 8 may be a passive shape-imparting structure for the bladder 6, in that the frame 8 does not actively move on its own to impart a shape to the bladder 6, but is moved by the bladder 6 when the bladder dilates and then contracts. In other words, the frame 8 may move because the fluid is delivered or removed from the bladder 6. The frame 8 may thus impart a shape to the bladder 6 by the bladder 6 being stretched around the frame 8 and by the frame 8 being attached to the inside surface 34 of the bladder 6.

As shown in FIGS. 9-10, three of the four sides (i.e. the front side 36 and the lateral side 38 and the opposite lateral side not shown in FIGS. 9-10) of the frame 8 are non-moving portions and do not move with respect to (away from) the vehicle 2 when the bladder 6 is dilating, while a fourth side of the frame (i.e. the rear side 40) does move along with the dilating bladder 6 and with respect to the vehicle 2 (upward away from the vehicle 2) when the bladder 6 is dilating. Other number of sides of the frame 8 can move or not move during dilating and contracting of the bladder 6.

The frame 8 may be an active shape-imparting structure for the bladder 6, in that the frame 8 moves on its own, separate and apart from the bladder 6 dilating and contracting, so as to actively impart a shape to the bladder 6. The frame 8 may change shape, move (e.g. outward and inward from the vehicle 2), or otherwise actively impart a shape to the bladder 6. When active, the frame 8 may impart one shape to the bladder 6 in the initial state, and another different shape to the bladder 6 in the dilated state. The frame 8 may actively move via a spring tension in the frame 8 itself, or via an external mechanism that exerts a moving force to the frame 8.

When the frame 8 is a passive or active shape-imparting structure, the shape of the bladder 6 in the dilated state may be a function of the frame 8 shape as well as a function of the fluid in the enclosed volume 16 exerting an outward strain on the bladder 6 pressing against the inside surface 34 of the bladder 6.

The frame 8 is more rigid than the bladder 6, and thus adds rigidity to the elastic bladder 6 and supports the bladder 6. When air flows over the bladder 6 in the dilated state or in the initial state, e.g. during vehicle 2 movement or wind gusts, the frame 8 provides resistance to compression of the bladder 6, e.g. the outer side 50 of the bladder 6, against the airflow, and helps to maintain a shape of the bladder 6 in the dilated state as well as in the initial state. In the dilated state, the frame 8 may inhibit the bladder 6 from being pushed back down toward the vehicle 2 or changing shape when subjected to the airflow. When in the dilated state and the initial state, the frame 8 may inhibit the bladder 6 from flapping in the wind and making noise. In the initial state, the frame 8 may stretch the bladder 6 so that the exposed surface 28 stretches substantially flat across the open center 44 of the frame 8 and thus provide a similar appearance as the adjacent outer surface 30 of the boot 14. The frame 8 may define at least a portion of the shape of the bladder 6 in the dilated state, for example by restricting the dilation of the bladder 6 so that the dilated bladder 6 assumes a desired shape. The frame 8 may also support the outer side 50 of the bladder 6 when the pressure inside the bladder 6 is less than the pressure outside the bladder 6.

The frame 8 is also elastic, and thus can bend, dilate, or distort (e.g. FIG. 10) with the bladder 6 as the bladder 6 dilates, and also the frame 8 returns to an initial position (e.g. FIG. 9) when the bladder 6 is contracted. The frame 8 may be formed of metal, polymers, or other materials and composites thereof.

A method (FIG. 11) of operating the inflatable aerodynamic system 4 may include steps a) to d), other steps, fewer steps, repeated steps, or different combinations thereof.

Step a

Figure 11:
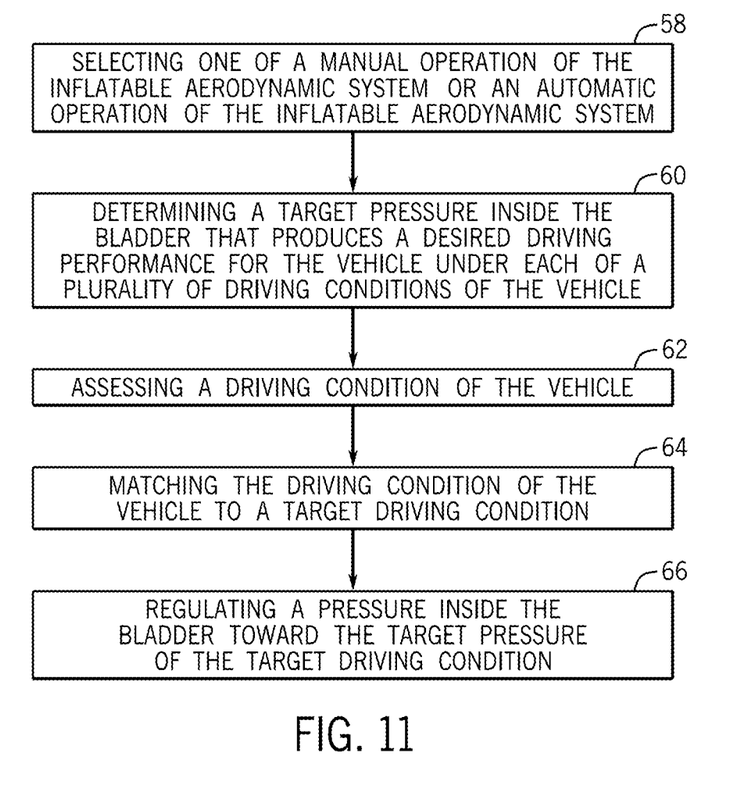
FIG. 11 is a process flow diagram of a method according to the present subject matter.

Step a) at 60 includes determining a target pressure inside the bladder 6 that produces a desired driving performance for the vehicle 2 under each of a plurality of driving conditions of the vehicle 2. The target pressure may be equal to, more, or less than the pressure outside the bladder 6.

1. Prototype

The target pressure that will produce a desired driving performance for the vehicle 2 under each of a plurality of driving conditions may be determined in real time by machine learning with respect to the vehicle 2, or at a prior time by using a prototype of the vehicle 2 (which prototype vehicle may be real or computer simulated).

If the prototype of the vehicle 2 (which may be real or computer simulated) is used, the target pressure may be determined by the prototype vehicle being put through the plurality of driving conditions (which may be real or computer simulated, respectively, depending on the nature of the prototype vehicle being real or computer simulated), varying the pressure inside the bladder of the prototype vehicle during the plurality of driving conditions, and determining which bladder pressure (i.e. the optimal or target bladder pressure) results in a driving performance for the prototype vehicle that meets, or gets closest to, the desired driving performance for the prototype vehicle under each of the plurality of driving conditions.

2. Machine Learning

If machine learning is used, it may be performed in real-time during use of the vehicle 2 by putting the vehicle 2 through the plurality of driving conditions, varying the bladder pressure in the bladder 6 of the vehicle 2 during the plurality of driving conditions, and measuring the driving performance of the vehicle 2 in each of the plurality of driving conditions under the varying bladder pressures, and determining which bladder pressure (i.e. the optimal or target bladder pressure) results in a driving performance for the vehicle 2 that meets, or gets closest to, the desired driving performance for the vehicle 2 under each of the plurality of driving conditions.

The plurality of driving conditions, to which the (prototype) vehicle is subjected and during which the bladder pressure is varied and the driving performance is assessed, may include a force, environmental factor or influence, or other stimulus or circumstance effecting the (prototype) vehicle, which may (or may not) affect the driving performance of the (prototype) vehicle. The plurality of driving conditions to which the (prototype) vehicle is subjected, may include different air temperatures around the (prototype) vehicle, different lift forces exerted on the (prototype) vehicle, different down forces exerted on the (prototype) vehicle, different side forces exerted on the (prototype) vehicle, different drag forces exerted on the (prototype) vehicle, different air pressure distributions on the (prototype) vehicle, different geographic locations of the (prototype) vehicle, different forces applied to brakes of the (prototype) vehicle, or combinations thereof. The plurality of driving conditions to which the (prototype) vehicle is subjected, may further include different speeds of the (prototype) vehicle.

The pressure inside the bladder of the (prototype) vehicle is varied for each of the plurality of driving conditions. This will reveal (e.g. by measurement or observation) an optimal bladder pressure (i.e. pressure inside the bladder) that results in a driving performance that meets, or gets closest to, the desired driving performance under each of the plurality of driving conditions, which optimal bladder pressure is then designated as the target pressure for the vehicle 2 in each of the plurality of driving conditions.

The desired driving performance may be selected based on one or more criteria including energy consumption per unit of distance traveled for the (prototype) vehicle (e.g. gas mileage or fuel economy), traction of wheels of the (prototype) vehicle with the road, stopping ability of the (prototype) vehicle, an amount by which a force is acting on the (prototype) vehicle (e.g. lift force, down force, side force, drag force, etc.), other criteria, and combinations thereof. The desired driving performance may be based on a minimization, maximization, or maintaining of these selected criteria.

For example, if the plurality of driving conditions include different lift forces exerted on the (prototype) vehicle, and the desired driving performance is the minimization of lift forces, then for each different lift force, the bladder pressure may be varied to produce different effects on that particular lift force. The desired driving performance may be where the lift force is minimized the most. The bladder pressure that produces that desired driving performance (i.e. minimizing the lift force the most) at that particular lift force is the target pressure for that particular driving condition. This may be desired to keep the proper amount of pressure on the wheels to keep them pressed down against the road and maintain traction. If the driving conditions include different down forces exerted on the (prototype) vehicle, such as in cornering, and the desired driving performance is the maximization of down forces to allow for better cornering of the vehicle, then for each different down force, the bladder pressure may be varied to produce different effects on that particular down force. The desired driving performance may be where the down force is maximized the most, such as when the vehicle is cornering. The bladder pressure that produces that desired driving performance (i.e. maximizing the down force the most) at that particular down force is the target pressure for that particular driving condition. This may be desired to increase the traction of the wheels of the prototype with the road, e.g. during a braking event and/or during cornering. If the driving conditions include different forces applied to brakes of the (prototype) vehicle, and the desired driving performance is maximizing the stopping ability of the (prototype) vehicle or improved handling during cornering, then for each different force (brake force) applied to the brakes, the bladder pressure may be varied to produce different effects on the stopping ability and/or cornering for that particular brake force. The desired driving performance is where the stopping/cornering ability of the (prototype) vehicle may be maximized. The bladder pressure that produces that desired driving performance (i.e. maximizing the stopping/cornering ability) at that particular brake force is the target pressure for that particular driving condition.

Step b

Step b) at 62 includes assessing a driving condition of the vehicle 2. The driving condition of the vehicle 2 may be a force, environmental factor or influence, or other stimulus or circumstance currently affecting the vehicle 2, which may (or may not) affect the driving performance of the vehicle 2. The driving condition of the vehicle 2 may include an air temperature around the vehicle 2, a lift force exerted on the vehicle 2, a down force exerted on the vehicle 2, a side force exerted on the vehicle 2, a drag force exerted on the vehicle 2, an air pressure distribution on the vehicle 2, a geographic location of the vehicle 2, a force applied to brakes of the vehicle 2, or combinations thereof. The driving conditions of the vehicle 2, may further include a speed of the vehicle 2. The driving condition of the vehicle 2 may be assessed by one or more sensors on the vehicle 2.

Step c

Step c) at 64 may include matching the current driving condition of the vehicle 2 to one of the plurality of driving conditions to which the (prototype) vehicle was previously subjected. The one that is matched to the driving condition of the vehicle 2 is designated as the target driving condition for the vehicle 2 in the current driving condition.

The current driving condition of the vehicle 2 may be matched to one of the plurality of driving conditions of the (prototype) vehicle by comparison with the plurality of driving conditions, and selecting one of the plurality of driving conditions that is closest, i.e. matched, to the current driving condition of the vehicle 2. This matched one of the plurality of driving conditions of the (prototype) vehicle is then the target driving condition for the vehicle 2 under the current driving condition, which has a target pressure as revealed in step a).

If, for example, the lift force exerted on the vehicle 2 is the current driving condition under consideration, then this current lift force may be compared to the plurality of lift forces previously exerted on the (prototype) vehicle, and then matched to the closest one of the plurality of lift forces previously exerted on the (prototype) vehicle, this closest one of the plurality of lift forces previously exerted on the (prototype) is designated as the target driving condition. This target driving condition, as discovered in step a), has an optimal bladder pressure (i.e. target pressure) that produces the desired driving performance for the (prototype) vehicle under this particular lift force.

Step d

Step d) at 66 may include regulating a current pressure inside the bladder 6 of the vehicle 2 toward the target pressure of the target driving condition. This may be done by regulating an amount of the fluid currently confined in the bladder 6 by using the fluid supply system 10 to deliver or remove fluid from the bladder 6. The pressure inside bladder 6 may be regulated to be equal to the target pressure or within a predetermined range therefrom. This regulation of pressure inside the bladder 6 may thereby change the shape of the bladder 6, altering the shape and aerodynamics of the vehicle 2, and thus affect the driving performance of the vehicle 2 under the current driving condition. The regulation of the bladder pressure to match the target pressure may thus urge a driving performance for the vehicle 2 towards the desired driving performance under the current driving condition.

Other Steps

The method may also include, before steps a)-d), a step at 58 of selecting one of a manual operation of the inflatable aerodynamic system 4 of the vehicle 2 or an automatic operation of the inflatable aerodynamic system 4 of the vehicle 2. The selection between the manual operation and the automatic operation may be done using a switch associated with the vehicle 2, and this may be done at any time including when the vehicle 2 is not being driven.

If the manual operation of the inflatable aerodynamic system 4 is selected, then the bladder 6 may be dilated or contracted to a predetermined pressure without performing steps a)-d).

The manual operation may include manually selecting a deployed state for the bladder 6, which causes the fluid supply system 10 to deliver fluid to the bladder 6 to dilate the bladder 6 to the dilated state, which may be done irrespective of the driving conditions. The manual operation may also include manually selecting a stowed state for the bladder 6, which causes the fluid supply system 10 to remove fluid from the bladder 6 to allow the bladder 6 to contract to the initial state, which may be done irrespective of the driving conditions. The manual operation may also include manually selecting the contracted state for the bladder 6, which causes the fluid supply system 10 to remove fluid from the bladder 6 to allow the bladder 6 to contract from the initial state to the contracted state, which may be done irrespective of the driving conditions. The selection between the deployed state, the stowed state, and the contracted state may be done using a switch associated with the vehicle 2, and this may be done at any time including when the vehicle 2 is not being driven.

If the automatic operation of the inflatable aerodynamic system 4 of the vehicle 6 is selected, then steps a)-d) may be performed automatically by the vehicle 2 and associated systems, e.g. a computer system, a sensor system, a processing system, etc., of the vehicle 2.

The automatic operation of the inflatable aerodynamic system 4 may include selecting a first mode of operation for the inflatable aerodynamic system 4, a second mode of operation for the inflatable aerodynamic system 4, or a third mode of operation for the inflatable aerodynamic system 4.

The first mode of operation for the inflatable aerodynamic system 4 may be a "sports" mode, and may produce more down forces exerted on the vehicle 2 than in the second mode of operation and the third mode of operation, and the desired driving performance for the vehicle 2 under the current driving condition in the first mode of operation may include an increase in control during driving of the vehicle 2 due to increased friction of the vehicle tires with the road.

The second mode of operation for the inflatable aerodynamic system 4 of the vehicle 6 may be an "economy" mode, and may produce less drag forces on the vehicle 2 than in the first mode of operation and the third mode of operation, and the desired driving performance for the vehicle 2 under the current driving condition in the second mode of operation may include a decrease in energy consumption (increased fuel economy) during driving of the vehicle 2.

The third operation for the inflatable aerodynamic system 4 may be a "comfort" mode, and may produce less lift forces on the vehicle 2 and/or may produce less changes in the lift forces on the vehicle 2 than in the first mode of operation and the second mode of operation, and the desired driving performance for the vehicle 2 under the current driving condition in the third mode of operation may include an increase in comfort of passengers during driving of the vehicle 2, e.g. by decreasing the frequency and amplitude of an up and down movement of the vehicle 2.

The automatic operation of the inflatable aerodynamic system 4 may include in step b), using a sensor to assess the air temperature around the vehicle 2, the lift force exerted on the vehicle 2, the down force exerted on the vehicle 2, the side forces on the vehicle 2, the drag forces on the vehicle 2, the air pressure distribution on the vehicle 2, the geographic location of the vehicle 2, the force applied to the brakes of the vehicle 2, or combinations thereof.

The automatic operation of the inflatable aerodynamic system 4 may be a dynamic operation of the inflatable aerodynamic system 4, and may include repeatedly performing steps a)-d) at predetermined time intervals, or repeatedly performing steps b)-d) at predetermined time intervals. The predetermined time intervals are not particularly limited, and these may be regular or not, and may range from 1 nanosecond or less, to 1000 days.

If the dynamic operation of the inflatable aerodynamic system 4 includes repeatedly performing steps a)-d) at predetermined time intervals, then the target pressure may be determined in step a) by machine learning as described herein.

If the dynamic operation of the inflatable aerodynamic system 4 includes repeatedly performing steps b)-d) at predetermined time intervals, then the target pressure may be determined in step a) by testing the prototype of the vehicle 2 as described herein.

If the current driving condition of the vehicle 2 includes the air temperature around the vehicle 2, then the method may further include not performing step d) if the air temperature is below a predetermined air temperature. This predetermined air temperature may be a low temperature at which mechanical failure or damage of the bladder 6, fluid supply system 10, or other components may occur. For example, at cold temperatures, the bladder 6 may become less elastic, and even hard or brittle, so as not to readily expand and contract when the bladder pressure is changed, and therefore the pressure inside the bladder 6 may not be regulated to dilate or contract the bladder 6 so as to protect the bladder 6 from damage or improperly dilating or contracting.

If the current driving condition of the vehicle 2 includes the geographic location of the vehicle 2, then the method may further include not performing step d) if the geographic location matches a predetermined location. This predetermined location may be governed by laws that restrict operation of the inflatable aerodynamic system 4. For example, a first political territory may have laws that do not allow for operation of the inflatable aerodynamic system 4, while a second political territory to which the vehicle 2 is transported (e.g. driven) may allow for operation of the inflatable aerodynamic system 4. Therefore, the pressure inside the bladder 6 may not be regulated (e.g. dilated or contracted) in the first political territory because this first political territory is the predetermined location, and thus the non-performance of step d), and optionally steps a)-c) also, follows the local laws there. If the vehicle 2 is transported to the second political territory that does allow for the operation of the inflatable aerodynamic system 4, then step d) may be performed, along with steps a)-c) also.

Figure 2:
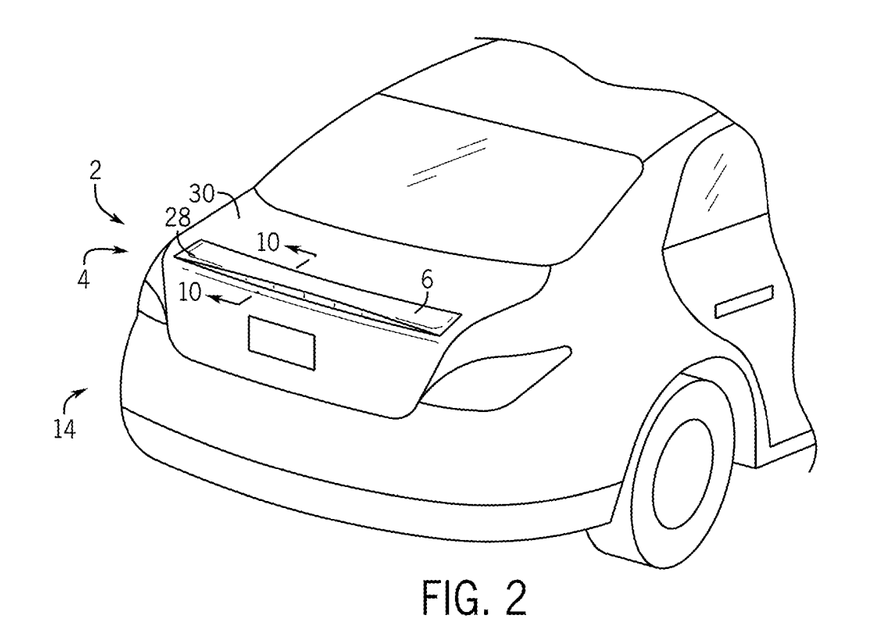
FIG. 2 is a partial perspective view of the inflatable aerodynamic system of FIG. 1 in a dilated state.

If the current driving condition of the vehicle 2 includes the force applied to the brakes of the vehicle 2, then step d) may include increasing the pressure inside the bladder 6 to be above a predetermined limit if the force applied to brakes of the vehicle 2 exceeds a predetermined force. This function may allow the inflatable aerodynamic system 4 to be used to slow the vehicle 2 down, e.g. to avoid a head on collision. The predetermined limit for the bladder pressure may be a pressure to which the bladder 6 is dilated to reach a predetermined inflation level, e.g. as shown in FIG. 2. If a driver slams on the brakes of the vehicle 2, e.g. to avoid a head on collision, such that the force applied to brakes of the vehicle 2 exceeds the predetermined force, then the bladder pressure may increase above the predetermined limit so as to overinflate (over-dilate) the bladder 6, e.g. as shown in FIG. 12, which may increase the drag forces acting on the vehicle and thus help to slow the vehicle 2 down more quickly, but otherwise may not improve any other driving performance of the vehicle 2. Depending on the location at which the bladder 6 is located on the vehicle 2 and the shape of the bladder 6 in the dilated state, the contracted state, and the initial state, the bladder pressure may be decreased to be equal to or less than the pressure outside the bladder 6, so that the bladder 6 contracts to the initial state or the contracted state, which may increase the drag forces acting on the vehicle 2 and thus help slow the vehicle 2 down when the force applied to brakes of the vehicle 2 exceeds the predetermined force. This may be useful for the bladders 6 shown in FIGS. 6-8, where the bladder 6 may be less aerodynamic in the initial state (FIG. 6) and the contracted state, than in the dilated state (FIG. 8), and thus when the force applied to brakes of the vehicle 2 exceeds the predetermined force, fluid may be removed from the bladders 6 so they can contract to the initial state or the contracted state, have a flat front or concave front (FIG. 13) that is less aerodynamic than in the dilated state, and thus help the vehicle 2 come to a stop.

Where the dynamic aerodynamic system 4 includes at least two bladders 6. These two bladders 6 may be identical or different, and may be arranged symmetrically or not with respect to a center line of the vehicle 2. The method may include dilating and contracting the two bladders symmetrically and in synchronization, meaning that they are dilated and contracted at the same rate and/or to the same extent, and the dilation and contraction of the two bladders are started at the same starting time. This is shown for example, between FIGS. 6 and 8, wherein the two bladders 6A, 6B are dilated (going from FIG. 6 to FIG. 8) starting at the same time, and at the same rate and/or to the same amount, and contracted (going from FIG. 8 to FIG. 6) starting at the same time, and at the same rate and/or to the same amount. The method may include dilating and contracting the two bladders 6A, 6B asymmetrically and in synchronization, meaning that they are dilated and contracted at different rates and/or to different amounts, but the dilation and contraction are started at the same time. The method may include dilating and contracting the two bladders 6A, 6B asymmetrically and not in synchronization, meaning that they are dilated and contracted at different rates and/or to different amounts, and the dilation and contraction are started at different times. FIG. 7 shows an asymmetric dilation of the two bladders 6, wherein the left bladder 6A is dilated and the right bladder 6B is contracted. FIG. 3 also shows an asymmetric dilation of the at least two bladders 6A, 6B, wherein the left bladder 6A is in the initial state and the right bladder 6B is dilated. The inflatable aerodynamic system 4 of FIG. 3 may include more than two bladders 6A, 6B, such as three bladders, the dilation and contraction of which are symmetrical/asymmetrical and/or synchronized/asynchronized between them. The (a) symmetric and (a) synchronous dilation and contraction of multiple bladders may be performed as needed to achieve the desired driving performance of the vehicle 2.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of operating an inflatable aerodynamic system of a vehicle, the inflatable aerodynamic system comprising an elastic bladder including a surface defining a visible surface of the vehicle, the bladder dilating upon an increase in a pressure inside the bladder and/or contracting upon a decrease in the pressure inside the bladder, the method comprising:
   a) determining a target pressure inside the bladder that produces a desired driving performance for the vehicle under each of a plurality of driving conditions of the vehicle, wherein each of the plurality of driving conditions includes different air temperatures around the vehicle, different lift forces exerted on the vehicle, different down forces exerted on the vehicle, different side forces exerted on the vehicle, different drag forces exerted on the vehicle, different air pressure distributions on the vehicle, different geographic locations of the vehicle, different forces applied to brakes of the vehicle, or combinations thereof;
   b) assessing a driving condition of the vehicle, the driving condition including an air temperature around the vehicle, a lift force exerted on the vehicle, a down force exerted on the vehicle, a side force exerted on the vehicle, a drag force exerted on the vehicle, an air pressure distribution on the vehicle, a geographic location of the vehicle, a force applied to brakes of the vehicle, or combinations thereof;
   c) matching the driving condition of the vehicle to a target driving condition, the target driving condition being one of the plurality of driving conditions of the vehicle; and
   d) regulating a pressure inside the bladder toward the target pressure of the target driving condition by regulating an amount of a fluid confined in the bladder and thereby urging a driving performance for the vehicle towards the desired driving performance under the driving condition.

2. The method of claim 1, further including selecting one of a manual operation of the inflatable aerodynamic system or an automatic operation of the inflatable aerodynamic system, wherein:
   if the manual operation of the inflatable aerodynamic system is selected, then the bladder is dilated or contracted to a predetermined pressure without performing steps a)-d); and
   if the automatic operation of the inflatable aerodynamic system is selected, then steps a)-d) are performed.

3. The method of claim 2, further including selecting the manual operation of the inflatable aerodynamic system, wherein the manual operation of the inflatable aerodynamic system includes:
   selecting a deployed state for the inflatable aerodynamic system where the bladder is dilated and the surface of the bladder stands proud of an adjacent outer surface of the vehicle,
   selecting a stowed state for the inflatable aerodynamic system where the bladder is less dilated than in the deployed state, or
   selecting a contracted state for the inflatable aerodynamic system where the the bladder is less dilated than in the stowed state and the surface of the bladder is recessed below the adjacent outer surface of the vehicle.

4. The method of claim 2, further including selecting the automatic operation of the inflatable aerodynamic system, wherein:
   the automatic operation of the inflatable aerodynamic system includes selecting a first mode of operation for the inflatable aerodynamic system, a second mode of operation for the inflatable aerodynamic system, or a third mode of operation for the inflatable aerodynamic system;
   the first mode of operation produces more of the down force exerted on the vehicle than in the second mode of operation and the third mode of operation, and the desired driving performance for the vehicle under the driving condition in the first mode of operation includes an increase in control during driving of the vehicle;
   the second mode of operation produces less of the drag force exerted on the vehicle than in the first mode of operation and the third mode of operation, and the desired driving performance for the vehicle under the driving condition in the second mode of operation includes a decrease in energy consumption during driving of the vehicle; and
   the third mode of operation produces less of the lift force exerted on the vehicle and/or produces less changes in the lift force exerted on the vehicle than in the first mode of operation and the second mode of operation, and the desired driving performance for the vehicle under the driving condition in the third mode of operation includes an increase in comfort of passengers during driving of the vehicle.

5. The method of claim 2, further including selecting the automatic operation of the inflatable aerodynamic system, wherein the automatic operation includes in step b), using a sensor to assess the air temperature around the vehicle, the lift force exerted on the vehicle, the down force exerted on the vehicle, the side force on the vehicle, the drag force on the vehicle, the air pressure distribution on the vehicle, the geographic location of the vehicle, the force applied to the brakes of the vehicle, or combinations thereof.

6. The method of claim 5, wherein the automatic operation of the inflatable aerodynamic system is a dynamic operation of the inflatable aerodynamic system and includes repeatedly performing steps a)-d) at predetermined time intervals, or repeatedly performing steps b)-d) at predetermined time intervals.

7. The method of claim 6, wherein:
the dynamic operation of the inflatable aerodynamic system includes repeatedly performing steps b)-d) at predetermined time intervals; and
in step a), the target pressure is determined by testing a prototype of the vehicle.

8. The method of claim 6, wherein:
the dynamic operation of the inflatable aerodynamic system includes repeatedly performing steps a)-d) at predetermined time intervals; and
in step a), the target pressure is determined by machine learning.

9. The method of claim 1, wherein the plurality of driving conditions further includes different speeds of the vehicle.

10. The method of claim 1, wherein:
the driving condition of the vehicle includes the air temperature around the vehicle; and
the method further includes not performing step d) if the air temperature is below a predetermined air temperature.

11. The method of claim 1, wherein:
the driving condition of the vehicle includes the geographic location of the vehicle; and
the method further includes not performing step d) if the geographic location matches a predetermined location.

12. The method of claim 1, wherein:
the driving condition of the vehicle includes the force applied to the brakes of the vehicle; and
step d) includes increasing the pressure inside the bladder to be above a predetermined limit if the force applied to brakes of the vehicle exceeds a predetermined force.

13. The method of claim 1, wherein:
the driving condition of the vehicle includes the force applied to the brakes of the vehicle; and
step d) includes making the pressure inside the bladder to be equal to a pressure outside the bladder if the force applied to brakes of the vehicle exceeds a predetermined force.

14. The method of claim 1, wherein the elastic bladder is a first elastic bladder, wherein the inflatable aerodynamic system further comprises a second elastic bladder including a second surface defining a visible surface of the vehicle.

15. The method of claim 14, further including dilating and contracting the first elastic bladder and the second elastic bladder symmetrically and in synchronization.

16. The method of claim 14, further including dilating and contracting the first elastic bladder and the second elastic bladder asymmetrically and in synchronization.

17. The method of claim 14, further including dilating and contracting the first elastic bladder and the second elastic bladder asymmetrically and not in synchronization.

18. The method of claim 1, wherein:
the inflatable aerodynamic system further includes a fluid supply system;
the fluid supply system being fluidly connected to the bladder; and
the fluid supply system regulates the pressure inside the bladder by regulating an amount of the fluid inside the bladder.

19. The method of claim 1, wherein the bladder is arranged on one of a boot and a roof of the vehicle.

20. The method of claim 1, wherein the bladder is arranged on a front bumper of the vehicle, wherein:
the bladder protrudes forward from an adjacent front surface of the front bumper when the bladder is dilated, and is flush with the adjacent front surface of the front bumper when the bladder is fully contracted; or
the bladder protrudes downward from an adjacent bottom surface of the front bumper when the bladder is dilated, and is flush with the adjacent bottom surface of the front bumper when the bladder is fully contracted.

* * * * *